United States Patent Office 3,718,666
Patented Feb. 27, 1973

3,718,666
SUBSTITUTED PHENYLACETONITRILES
Horst Zeugner, Hannover, Klaus-Wolf von Eickstedt, Hannover-Bemerode, Werner Stuhmer, Eldagsen, and Siegfried Funke, Hannover, Germany, assignors to Kali-Chemie Aktiengesellschaft, Hannover, Germany
No Drawing. Filed Dec. 30, 1970, Ser. No. 102,961
Claims priority, application Germany, Jan. 7, 1970, P 20 00 435.7
Int. Cl. C07d 15/18
U.S. Cl. 260—340.3     2 Claims

ABSTRACT OF THE DISCLOSURE

α-Isopropyl-α-[(N-methyl-N-homoveratryl)-γ - aminopropyl]-3,4-ethylenedioxy-phenylacetonitrile of the formula

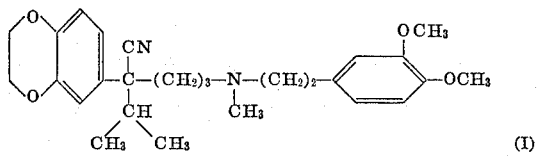

and pharmaceutically acceptable acid addition compounds thereof.

The compounds have a dilatent effect on the coronary vessels and improve the contractility of the cardiac muscle. They are therefore suited for treatment of heart patients suffering from coronary insufficiency.

BACKGROUND OF THE INVENTION

It has long been known that basically substituted phenylacetonitriles constitute valuable therapeutically active agents. For instance, aminonitriles of the formula

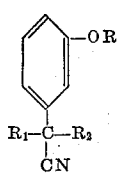

$$CH_3-CH_2-CH-\underset{\underset{CN}{|}}{\overset{\overset{CH_3}{|}}{C}}-CH_2-CH_2-N(Alkyl)_2$$

were obtained by S. Funke and W. Stühmer (German Pat. 960,462). These compounds had a good analgesic effect.

Further basically susbtituted phenylacetonitrile are disclosed in German Pats. 964,499 and 964,500, both of which are patents of addition to the aforementioned Pat. 960,462.

The compounds disclosed in Pat. 964,499 have the formula

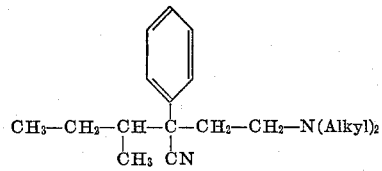

in which Am is dialkylamino or cyclic amino. They have analgesic and spasmolytic effect.

The compounds of Pat. 964,500 have the formula

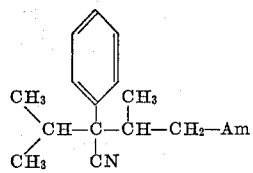

in which R=H or $CH_3$, $R_1$=alkyl or phenylalkyl and $R_2$ is a basically substituted alkyl group. These compounds are analgesics.

In German Pats. 1,154,810 and 1,158,083 basically substituted phenylacetonitriles are disclosed of the formula

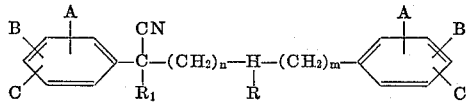

In this formula A, B and C are halogen, hydrogen, lower alkyl or lower alkoxy. In the latter case two adjoining groups may also form a methylene dioxy group. R in this formula is a lower aliphatic group, $R_1$ is lower alkyl, saturated or unsaturated cyclic or bicyclic hydrocarbon or phenyl or benzyl, and $n$ is 2, 3 or 4 and $m$ is 1, 2 or 3. These compounds have a dilatent effect on the coronaries which is only quantitatively different from that β-oxyethyl-theophylline.

SUMMARY OF THE INVENTION

The invention in the present case is the compound is identified as α-isopropyl-α-[(N - methyl - N - homoveratryl)-γ-aminopropyl] - 3,4 - ethylenedioxy - phenylacetonitrile of the formula

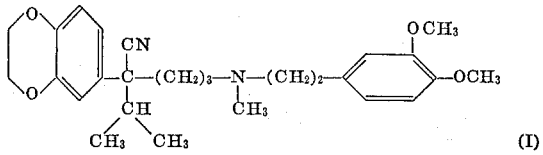

The invention also embraces the non-toxic pharmaceutically acceptable acid addition salts of the just-defined compounds. The invention furthermore includes pharmaceutically compositions in which the just-described compounds or their acid addition salts are the effective agents.

The invention also is directed to a method of treating heart patients suffering from coronary insufficiency with compositions in which the defined compounds are the active agents.

DETAILED DESCRIPTION OF THE INVENTION AND OF PREFERRED EMBODIMENTS

It has been unexpected and surprising that the compound of the invention, the α-isopropyl-α-[(N-methyl-N-homoveratryl)-γ-aminopropyl]-3,4 - ethylenedioxyphenylacetonitrile of the Formula I is not only distinguished by the dilatent action on the coronaries but has in particular a beneficial effect on the contractility of the cardiac muscle as indicated by the greater acceleration of the pressure increase in the left ventricle observed in the anesthetized dog.

The tests in which these observations were made were carried out by first giving a dog a morphine premedication and then anesthetizing the dog intravenously with chloralose. The acceleration of the pressure increase in the left ventricle is measured either with an electric manometer provided in the tip of a catheter or with a manometer which is disposed at the other end of a steel catheter and the measurement is converted by a differential amplifier into the mathematical term $dp/dt$.

The dilatation of the coronaries is measured in the same test by an electromagnetic flux meter head applied to a coronary artery or by means of the increase of the oxygen saturation of the hemoglobin of the blood in the coronary sinus.

The measurement of the oxygen saturation in the coronary sinus is effected by means of a catheter for which venous blood is obtained by suction. The measurement of the oxyhemoglobin in the venous blood is effected by means of the circulation vessels of an "Atlas" oximeter.

It is furthermore unexpected that the compound of Formula I, in the same test, has a negative chronotropic action in the area of the optimal coronary dilatent effect. The optimal coronary dilatation among others is characterize by the fact that simultaneously no distinct lowering of the blood pressure takes place. The negative chronotropic action was measured as the lowering of the heart frequency by means of an electrocardio-pulse device. The measurement of the blood pressure was carried out with a Statham pressure meter converter.

The activity of the compound of Formula I, in addition, is clearly discernible also in case of oral application. In the non-anesthetized dog, it has the positive effect of an increase of the coronary circulation which is apparent from an increase of the oxygen saturation of the blood in the coronary sinus.

The toxicity was determined with mongrel dogs (body weight from 8 to 14 kg.) by the method of Litchfield and Wilcoxon. In case of intravenous injection, the $LD_{50}$ was determined as 22.7 (19.9–26.1) mg. of the compound of claim 1 per kg. of body weight.

A distinct action on the coronary vessels could be observed in mongrel dogs already at a dose of 0.08 mg./kg. (intravenously). This action was determined by means of measuring the oxygen saturation of the blood in the coronary sinus of anesthetized dogs. This shows a most valuable therapeutical index since the intravenous toxicity of the compound is more than 200 times that of the intravenous therapeutically active dose.

In general, the effective dose of the compound lies in the range of 0.046 to 0.01 mg./kg. in case of intravenous application, and at 0.46 to 4.5 mg./kg. for oral application.

The compound of the invention can be used in the form of the conventional pharmaceutical ompositions as generally used in human medicine. Carrier materials for the compounds are particularly those which are inert as to the new compound, for instance vegetable oils, gelatins, lactose, polyethyleneglycols, starch, magnesium stearate, talcum, etc.

In case of parenteral application, solutions are preferred, particularly oily and aqueous solutions. However, suspensions and emulsions of the effective agent may also be used. For the enteral application tablets or lozenges may be used which may include the usual additives and auxiliary materials such as preservatives, stabilizers, wetting agents or flavoring agents.

PROCESS OF MAKING THE COMPOUND

The α-isopropyl-α-[(N-methyl - N - homoveratryl)-γ-aminopropyl]-3,4-ethylenedioxy-phenylacetonitrile of the formula

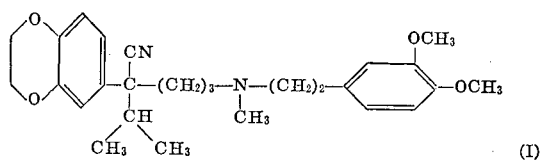

(I)

can be made in various ways. All of the reactions described below should be carried out in the presence of a basic condensation agent and in an inert solvent.

(A) The 3,4-ethylenedioxyphenylacetonitrile of the formula

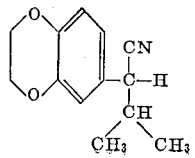

(II)

may be reacted with a compound of the formula

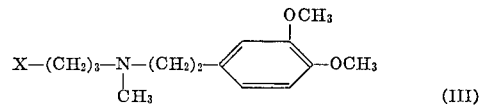

(III)

wherein X is a reactive acid residue.

(B) The 3,4-ethylenedioxyphenylacetonitrile of the formula

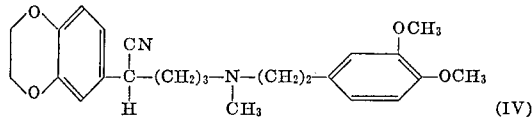

(IV)

may be reacted with an isopropylhalide.

(C) The 3,4-ethylenedioxyphenylacetonitrile of the formula

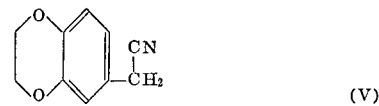

(V)

may be reacted with a compound of the Formula III as given above in which X has the stated meaning and in another step may be reacted with the isopropyl halide. The sequence of the reactions with the compound of Formula V and with the isopropyl halide is interchangeable in this case.

(D) The 3,4-ethylenedioxyphenylacetonitrile of the formula

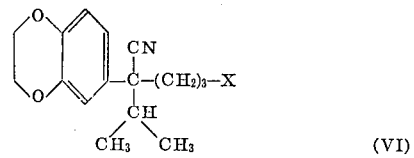

(VI)

wherein X has the same meaning as given above may be reacted with a compound of the formula

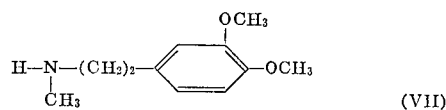

(VII)

(E) The 3,4 - ethylenedioxyphenylacetonitrile of the Formula VI as given above may be reacted with a compound of the formula

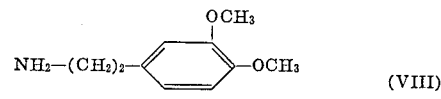

(VIII)

There is thus obtained a 3,4-ethylenedioxyphenylacetonitrile of the formula

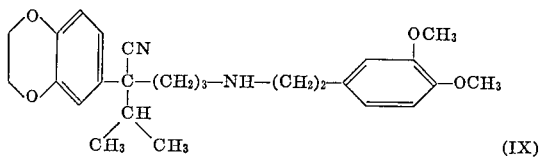

(IX)

which latter is then converted to the 3,4-ethylenedioxyphenylacetonitrile of Formula I in conventional manner.

The reaction of the 3,4-ethylenedioxyphenylacetonitriles with the compounds of the homoveratrylamine is effected at an elevated temperature, preferably between 30 and 150° C. while stirring and in the presence of a condensing agent. If ammonia is used, the temperature may be as low as about −33° C. The 3,4-ethylenedioxyphenylacetonitriles are reacted with the basic condensation agent, preferably sodium amide, in an inorganic solvent, and preferably are heated, for a time sufficient to reduce the ammonia generation. The compounds of the homoveratrylamine are then added to the reaction mass. It is, however, also possible first to mix the two main components of the reaction and subsequently to introduce the condensing agent into the solution of the components at boiling temperature.

In addition to sodium amide, other basic condensation agents useful in the reaction of the invention are: sodium hydride, sodium hydroxide, potassium amide, lithium amide, potassium carbonate or tertiary amines such as pyrimidine or triethylamine. It is also possible to use an excess of homoveratrylamino compounds for this purpose.

Solvents for the reaction are particularly aromatic hydrocarbons such as benzene, toluene or xylenes, ethers such as diethylether or dioxane or liquid ammonia.

The reactive acid residue X in the starting compound preferably is chlorine or bromine or the tosyl residue.

The introduction of the isopropyl residue is accomplished by reacting the particular compounds with an isopropyl halide such as isopropylchloride or isopropyl bromide, preferably in an inert solvent.

The subsequent introduction of the methyl group into the secondary amines may be carried out in conventional manner by treating the amine with formaldehyde or formic acid.

The free base is a viscous yellowish oil with a $BP_{0.1\,mm}$ of 285–290° C. The basic compound of Formula I can be converted into the non-toxic and physiologically compatible acid addition compounds by treatment with acids. Preferred in that case is the hydrochloride of the base since it can be obtained as a crystalline compound with a melting point between 172 and 174° C. and an excellent water solubility.

The reaction, however, may also be carried out with any acid resulting in physiologically and pharmaceutically acceptable salts. Thus, organic and inorganic acids may be used such as for instance aliphatic, alicyclic, araliphatic, aromatic or heterocyclic mono- or polycarboxylic acids. Examples are for instance acetic acid, propionic acid, diethylacetic acid, malonic acid, succinic acid, fumari acid, maleic acid, lactic acid, tartari acid, malic acid, citric, acid, sulfuric acid, hydrobromic acid, orthophosphoric acid, etc.

The following examples will further illustrate the invention. A summary of the graphic formulae involved in these reactions will be furnished below at the end of the examples.

Example 1

86.5 g. of α-isopropyl-3,4-ethylenedioxyphenylacetonitrile (Formula II), $B.P._{0.2}$=156–159° C. dissolved in 500 ml. toluene were reacted with 99 g. of N-(γ-chloropropyl)-N-methyl-homoveratrylamine (Formula III) and heated to the boiling point while stirring. The mass was then reacted with a suspension of 15.6 g. sodium amide in 100 ml. toluene and boiled and refluxed for 4 hours.

After cooling down, the reaction mass was poured into 700 ml. ice water, whereupon the toluene solution was separated and the mass was washed with water and shaken with dilute hydrochloric acid. The acid phase was then alkalized with sodium hydroxide. The separated base was taken up in benzene, washed with water, dried over sodium sulfate and concentrated by evaporation. The residue was taken up in ethanol and HCl gas was introduced into the solution until an acid reaction occurred. After dilution with ether, the hydrochloride of the α-isopropyl-α-[(N-methyl - N - homoveratryl)-γ-aminoprpyl]-3,4-ethylenedioxyphenylacetonitrile was thus obtained. After recrystallization from ethanol the compound had a melting point of 172–174° C. The yield was 122.9 g. (=69% of the theoretical yield).

Example 2

23.9 g. of α-isopropyl-3,4-ethylenedioxyphenylacetonitrile (Formula II) were dissolved in 140 ml. abs. benzene and brought to boiling. Thereafter, and while stirring, 4.3 g. of sodium amide suspended in 20 ml. abs. benzene were added dropwise. After 2 hours, to the reaction mixture was then added dropwise during a period of 40 minutes 27.2 g. of N-methyl-N-(γ-chloropropyl)-homoveratrylamine (Formula III) in 30 ml. abs. benzene. The reaction mixture was poured into ice after two hours and processed as stated in Example 1.

41.2 g. of the crude base, after reaction with HCl gas in ethanol, precipitation with ether and recrystallization from ethanol furnished 34.3 g. of α-isopropyl-α-[(N-methyl - N - homoveratryl)-γ-aminopropyl]-3,4-ethylenedioxyphenylacetonitrile hydrochloride. Mixing of this product with the product obtained in Example 1 did not result in any lowering of the melting point of the mixture.

Example 3

5 g. of α-isopropyl-α-(γ-chloropropyl)-3,4-ethylenedioxyphenylacetonitrile (Formula VI), which were still mixed with 10.6 g. of unreacted starting product of the Formula II, were heated together with 6.65 g. of N-methyl-homoveratrylamine (Formula VII) to 130° C. for a period of 7 hours. The reaction product, which had a temperature of 80° C., was then diluted with 50 ml. benzene and extracted with water after cooling. The benzene phase was then shaken with dilute hydrochloric acid. The acid aqueous solution was alkalized with concentrated sodium hydroxide while cooling with ice. After extraction with chloroform, drying and evaporation of the solvent, there were obtained 8.9 g. of the crude base which was filtered with 20 g. $Al_2O_3$ II/III, a product of the Merck Company of Germany. HCl gas was introduced into the filtrate and a hydrochloride was thus obtained which was mixed with the product obtained in Example 1. The mixture did not result in any lowering of the melting point.

The yield of α-isopropyl-α-[(N-methyl-N-homoveratryl)-γ - aminopropyl] - 3,4 - ethylenedioxyphenylacetonitrile hydrochloride was 2.1 g.

Example 4

7.2 g. of crude α-isopropyl-α-[(N-homoveratryl)-γ-aminopropyl] - 3,4 - ethylenedioxyphenylacetonitrile (Formula IX) (the melting point of the hydrochloride being 160–162° C.) were dissolved in 7 ml. isopropanol and heated with 4 ml. formalin, 0.4 ml. water and 28 ml. concentrated formic acid to 90° C. for a period of 8 hours. After cooling, reaction was effected with concentrated sodium hydroxide. The phases were then separated and the organic phase was dried over solid NaOH. The residue was distilled after evaporating the solvent.

The α-isopropyl-α-[(N-methyl - N - homoveratryl)-γ-aminopropyl] - 3,4 - ethylenedioxyphenylacetonitrile had a boiling point $B.P._{0.1\,mm.}$=285–290° C. The yield of hydrochloride obtained from this product was 0.4 g. The mixture with the product obtained in Example 1 did not result in any lowering of the melting point.

Example 5

6.4 g. of α-[(N-methyl-N-homoveratryl)-γ-aminopropyl]-3,4-ethylenedioxyphenylacetonitrile (Formula IV) of $B.P._{0.1}$=270–280° C. were dissolved in 150 ml. liquid ammonia in which 0.5 g. sodium was contained as sodium amide. 3.3 g. of isopropyl bromide was then added dropwise while stirring. The solution was subjected to boiling and refluxing for 2 hours. A small amount of ammonium chloride was then added, and the ammonia evaporated. Ether was added to the extent that the ammonia evaporated. After treating the mass in the same manner as described in other examples, 4.2 g. of the crude base was obtained, which was filtered after dissolving in benzene through 20 g. $Al_2O_3$ II/III of the Merck Company. HCl gas was introduced into the filtrate and the obtained hydrochloride did not result in any lowering of the melting point after mixture with the product obtained in Example 1. The yield was 0.3 g.

Example 6

17.6 g. of 3,4-ethylenedioxyphenylacetonitrile (Formula V) dissolved in 100 ml. toluene were subjected to boiling and refluxing with 7.8 g. $NaNH_2$ until the ammonia development ceased. A solution of 12.3 g. isopropylbromide in 30 ml. toluene and subsequently a solution of 27.2 g. N-(γ-chloropropyl)-N - methyl-homoveratrylamine (Formula III) in 50 ml. toluene were then added dropwise.

In an alternative test, the compound of Formula III was first added and the isopropyl bromide was then introduced without any change of results.

The reaction mixture was then subjected to boiling and refluxing for another 2 hours and was further treated as described in Example 1. There were obtained 2 g. of α-isopropyl-α-[(N-methyl - N - homoveratryl) - γ - aminopropyl] - 3,4 - ethylenedioxyphenylacetonitrile hydrochloride which did not show a lowering of the melting point when mixed with the product obtained in Example 1.

The following is a diagrammatic representation of the reactions occurring in the above examples.

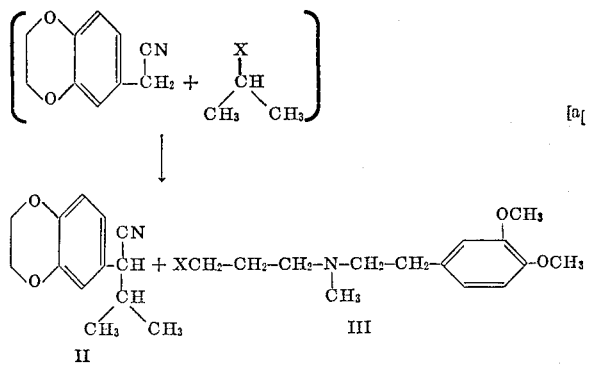

Examples 1 and 2

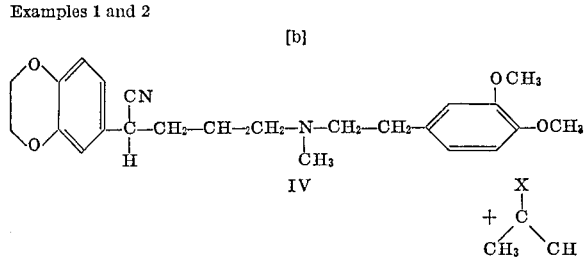

Example 5

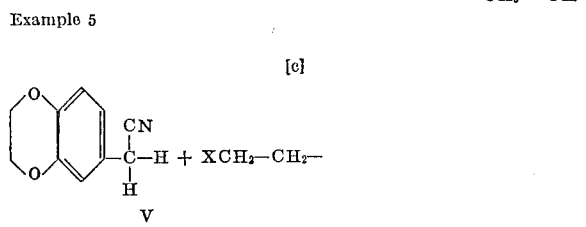

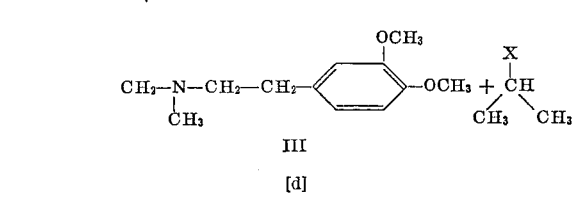

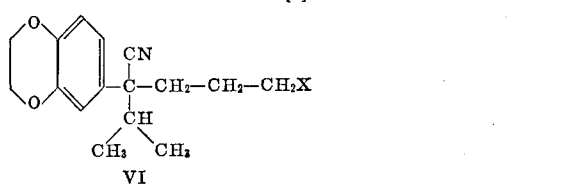

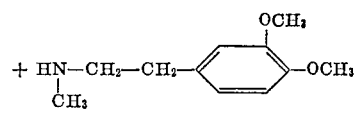

Example 3

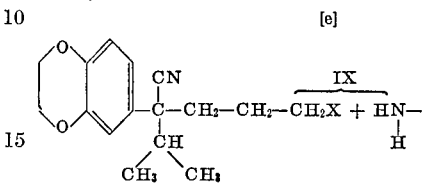

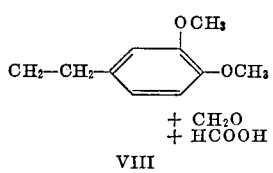

Example 4: IX + CH₂O + HCOOH

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. α-isopropyl - α - [(N - methyl - N - homoveratryl)-γ-aminopropyl]-3,4-ethylenedioxyphenylacetonitrile of the formula

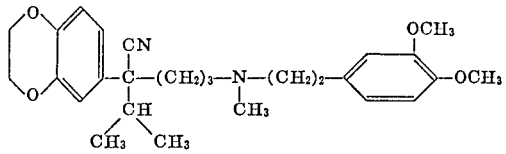

and pharmaceutically acceptable acid addition salts thereof.

2. The compound of claim 1 which is the α-isopropyl-α-[(n-methyl - N - homoveratryl)-γ-aminopropyl]3,4-ethylenedioxyphenylacetonitrile hydrochloride of the formula

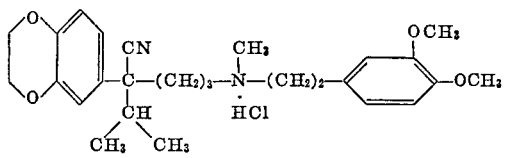

No references cited.

ALEX MAZEL, Primary Examiner
J. H. TURNIPSEED, Assistant Examiner

U.S. Cl. X.R.
424—278